US012161068B2

(12) United States Patent
Scott et al.

(10) Patent No.: US 12,161,068 B2
(45) Date of Patent: Dec. 10, 2024

(54) TRELLIS HUB FOR JOINING ELONGATE SPARS

(71) Applicants: Peter William Scott, Richmond South (AU); Jennifer Norton Grimwade, Richmond South (AU)

(72) Inventors: Peter William Scott, Richmond South (AU); Jennifer Norton Grimwade, Richmond South (AU)

(*) Notice: Subject to any disclaimer, the term of this patent is extended or adjusted under 35 U.S.C. 154(b) by 415 days.

(21) Appl. No.: 16/624,763

(22) PCT Filed: Jun. 20, 2018

(86) PCT No.: PCT/AU2018/000098
§ 371 (c)(1),
(2) Date: Dec. 19, 2019

(87) PCT Pub. No.: WO2018/232437
PCT Pub. Date: Dec. 27, 2018

(65) Prior Publication Data
US 2020/0113140 A1 Apr. 16, 2020

(30) Foreign Application Priority Data
Jun. 20, 2017 (AU) ................................ 2017902368

(51) Int. Cl.
*A01G 17/06* (2006.01)
*E04B 1/19* (2006.01)
(Continued)

(52) U.S. Cl.
CPC ............ *A01G 17/06* (2013.01); *E04B 1/1906* (2013.01); *E04B 1/388* (2023.08); *A01G 9/025* (2013.01);
(Continued)

(58) Field of Classification Search
CPC ...... A01G 17/06; A01G 9/025; E04B 1/1906; E04B 1/40; E04B 2001/1927;
(Continued)

(56) References Cited

U.S. PATENT DOCUMENTS 4,027,449 A * 6/1977 Alcalde Cilveti .... E04B 1/1906
403/171
4,039,263 A * 8/1977 Bassler ................. F16B 7/0486
D8/394
(Continued)

FOREIGN PATENT DOCUMENTS

FR 2609741 A1 * 7/1988 ........... E04B 1/1906
GB 2491160 A * 11/2012 ............... E04B 1/19
(Continued)

*Primary Examiner* — Brent W Herring
(74) *Attorney, Agent, or Firm* — TAROLLI, SUNDHEIM, COVELL & TUMMINO L.L.P.

(57) ABSTRACT

The present invention relates to a hub comprising i) a first hub member, comprising a first plurality of spar receiving zones; and ii) a second hub member, comprising a second plurality of spar receiving zones; wherein: a) the first and second hub members are located immediately adjacent to each other and share a common, substantially central axis; b) the first hub member is not identical to the second hub member; and c) each spar receiving zone of the first and second plurality of spar receiving zones is adapted to receive a spar, wherein the spar is adapted to link two hubs. The present invention further relates to methods of assembling three dimensional structures incorporating such hubs, including but not limited to trellis.

9 Claims, 4 Drawing Sheets

(51) Int. Cl.
*E04B 1/38* (2006.01)
*A01G 9/02* (2018.01)
*F16B 7/04* (2006.01)

(52) U.S. Cl.
CPC ............... *E04B 2001/1927* (2013.01); *E04B 2001/1933* (2013.01); *E04B 2001/1966* (2013.01); *F16B 7/048* (2013.01); *Y02P 60/20* (2015.11)

(58) Field of Classification Search
CPC ..... E04B 2001/1966; E04B 2001/1903; E04B 2001/3247; E04B 1/1909; E04B 1/388; E04B 2001/1933; F16B 7/048; Y02P 60/20; Y10T 403/32786
USPC ....... 47/47; 403/170, 218, 81.3, 373; 52/646
See application file for complete search history.

(56) References Cited

U.S. PATENT DOCUMENTS

| | | | | |
|---|---|---|---|---|
| 4,129,975 A * | 12/1978 | Gabriel | ............ | A63H 33/101 D8/382 |
| 4,161,088 A * | 7/1979 | Gugliotta | ............ | E04B 1/19 52/461 |
| 4,355,918 A | 10/1982 | Van Vliet | | |
| 4,562,682 A * | 1/1986 | Arvedi | ............ | E04B 1/19 403/171 |
| 4,591,286 A * | 5/1986 | Galan Inchaurbe | .... | F16B 7/185 403/171 |
| 4,930,930 A * | 6/1990 | Coppa | ............ | E04B 1/1909 52/645 |
| 4,932,808 A * | 6/1990 | Bar | ............ | E04B 1/1906 403/174 |
| 4,974,986 A | 12/1990 | Cook | | |
| 4,982,546 A * | 1/1991 | Lange | ............ | E04B 1/1906 403/174 |
| 5,074,094 A * | 12/1991 | Gassler | ............ | F16B 7/0486 403/171 |
| 5,095,677 A * | 3/1992 | Godbout | ............ | F16B 12/32 403/176 |
| 5,318,470 A * | 6/1994 | Denny | ............ | A63H 33/10 52/655.2 |
| 6,378,265 B1 | 4/2002 | Konstandt | | |
| 6,702,640 B1 * | 3/2004 | Park | ............ | A63H 33/04 446/85 |
| 6,854,238 B2 * | 2/2005 | Boots | ............ | F16B 12/50 52/81.3 |
| 7,481,235 B2 * | 1/2009 | Prusmack | ............ | E04H 15/18 135/147 |
| 7,954,297 B1 * | 6/2011 | Stearns | ............ | F16B 7/185 52/578 |
| 8,069,632 B2 | 12/2011 | Li | | |

FOREIGN PATENT DOCUMENTS

| | | | | |
|---|---|---|---|---|
| GB | 2557918 A | 7/2018 | | |
| WO | WO-9413895 A1 * | 6/1994 | ............ | E04B 1/1906 |
| WO | WO-2009087594 A2 * | 7/2009 | ............ | E04B 1/1906 |
| WO | 2009/128111 A1 | 10/2009 | | |

* cited by examiner

TRELLIS HUB FOR JOINING ELONGATE SPARS

FIELD OF THE INVENTION

The present invention relates to a hub, in particular a hub suitable for joining elongate members, and to methods of assembling three dimensional structures therefrom, including but not limited to trellis.

BACKGROUND

Trellis is a commonly used architectural structure, usually made from an open framework or lattice of interwoven or intersecting pieces of material that is normally used to support and display climbing plants. There are many different types of trellis for different places and for different plants. For example, in the domestic garden, trellis is used for climbers such as grapevines, clematis, ivy, and climbing roses or other support based growing plants. Trellis is also commonly used for supporting climbing rose varieties in order for them to reach their potential as garden plants. Some plants will climb and wrap themselves round a trellis with little artificial help being needed while others need training by passing the growing shoots through the trellis and/or tying them to the framework.

Although trellis has been used for hundreds of years, there still remains a need for improved forms. For example, many forms of trellis are available only in large panels, making them difficult to incorporate into individual gardens settings. Accordingly, the present invention seeks to provide a hub that can be used to assemble a trellis in a modular and customisable manner. Certain advantages of the present invention over previous trellis will become apparent to the skilled person. It will also become apparent that the hub of the present invention can be employed in a wide variety of domestic, industrial and commercial applications.

BRIEF DESCRIPTION OF THE INVENTION

According to a first aspect of the invention, there is provided a hub, comprising: i) a first hub member, comprising a first plurality of spar receiving zones; and ii) a second hub member, comprising a second plurality of spar receiving zones; wherein: a) the first and second hub members are located immediately adjacent to each other and share a common, substantially central axis; b) the first hub member is not identical to the second hub member; and c) each spar receiving zone of the first and second plurality of spar receiving zones is adapted to receive a spar, wherein the spar is adapted to link two hubs.

A trellis assembled according to the present invention may comprise a plurality of hubs, interconnected by spars. Preferably, the spars are elongate and substantially circular in cross section.

In certain embodiments of the present invention, the first and second pluralities of spar receiving zones are each adapted to receive an end of a spar. Preferably, the spar receiving zones are substantially circular in cross section.

In certain embodiments of the present invention, the first and second hub members are joined by a connector, whereby the connector defines the common, substantially central axis. Accordingly, the hub preferably comprises the first and second hub members and a connector that holds the hub members immediately adjacent to each other and defines the substantially central axis.

In certain embodiments of the present invention, the connector may be a fixing pin wherein the fixing pin joins the first and second hub members together and, in further embodiments, fixes the hub to a surface such as, but not limited to, a wall.

In certain embodiments of the present invention, the connector may be formed integrally with the first and/or second hub members, whereby the connector permits the two hub members to be joined without the need for additional components.

In certain embodiments of the present invention, the first plurality of spar receiving zones are arranged radially around the first hub member in a plane that is perpendicular to the central axis.

In certain embodiments of the present invention, the second plurality of spar receiving zones are arranged radially around the second hub member and directed at an angle that is not 90° from the central axis. In some embodiments of the present invention the angle is between 10° and 60°, in yet further embodiments the angle is approximately 20°.

In certain embodiments of the present invention, at least one of the first or second hub members comprises four spar receiving zones.

The present invention further provides a trellis preparation kit comprising the hub of the present invention and a plurality of spars.

The present invention also provides a trellis comprising a plurality of hubs according to the present invention and a plurality of spars connected thereto via the spar receiving zones.

FIGURES

DETAILED DESCRIPTION OF THE INVENTION

Figure 1:
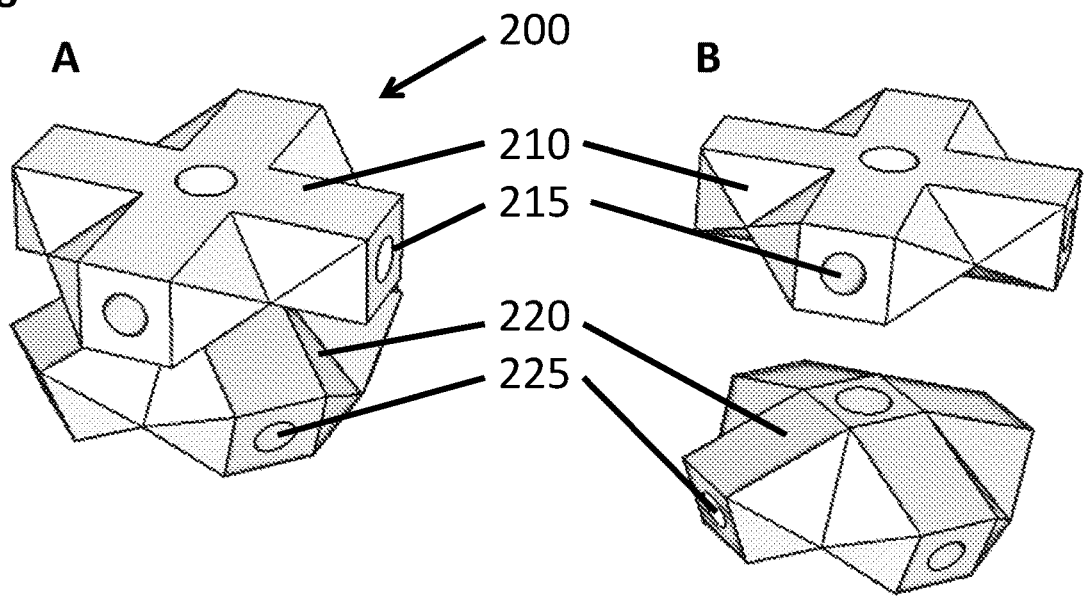
FIG. 1 shows a schematic diagram of an embodiment of a hub according to the present invention in complete form (A) and exploded view (B) showing the first and second hub members.
Figure 2:
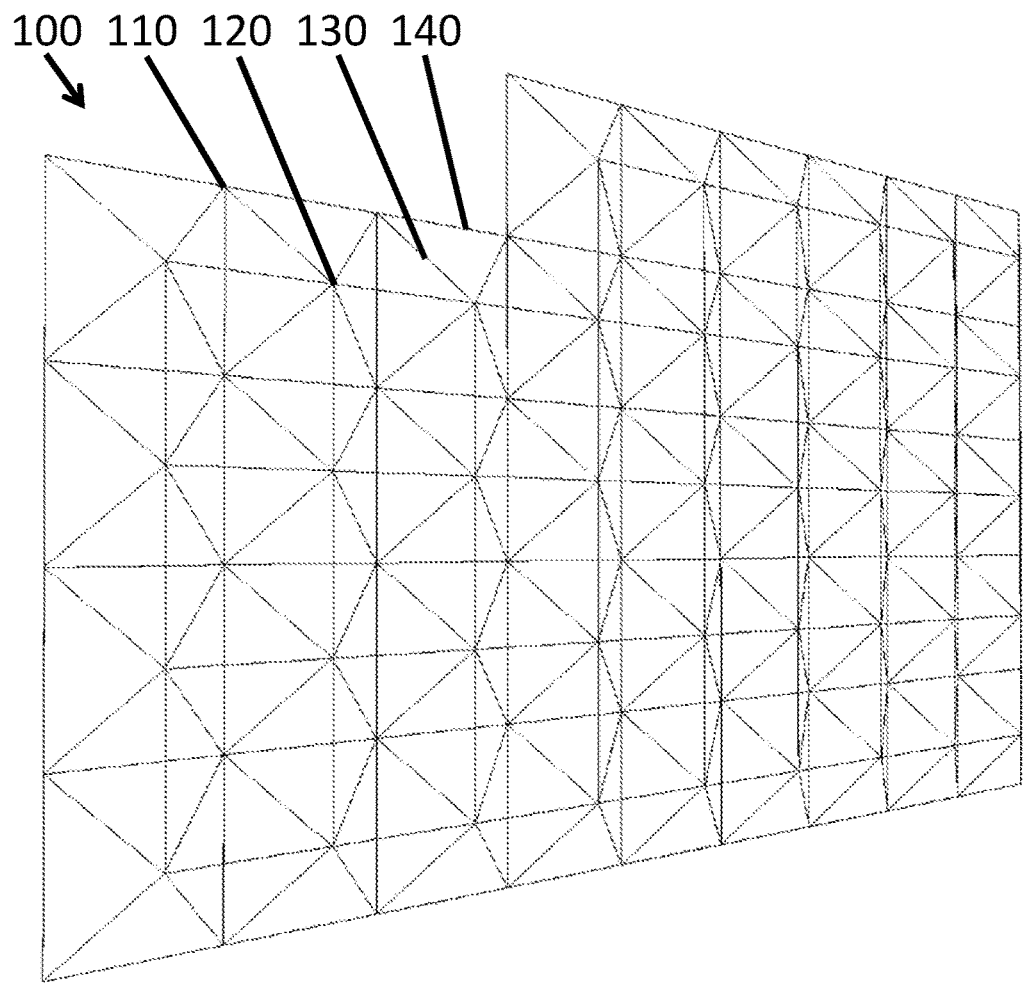
FIG. 2 shows a schematic representation of an embodiment of a trellis according to the present invention, which may be prepared using the embodiment of the hub shown in FIG. 1.

Referring to all the drawings wherein like reference numerals designate like or corresponding parts throughout the several views, a trellis (FIG. 2) prepared according to the present invention is a three-dimensional structure and comprises a first layer 110 of hubs 200 positioned in a first plane and a second layer 120 of hubs 200 positioned in a second plane, wherein the first and second planes are substantially parallel to each other and adjacent thereto. The distance between the planes is in part determined by the length of interconnecting internal spars 130 linking corresponding second hub members 220, as will be discussed further below.

Figure 3:
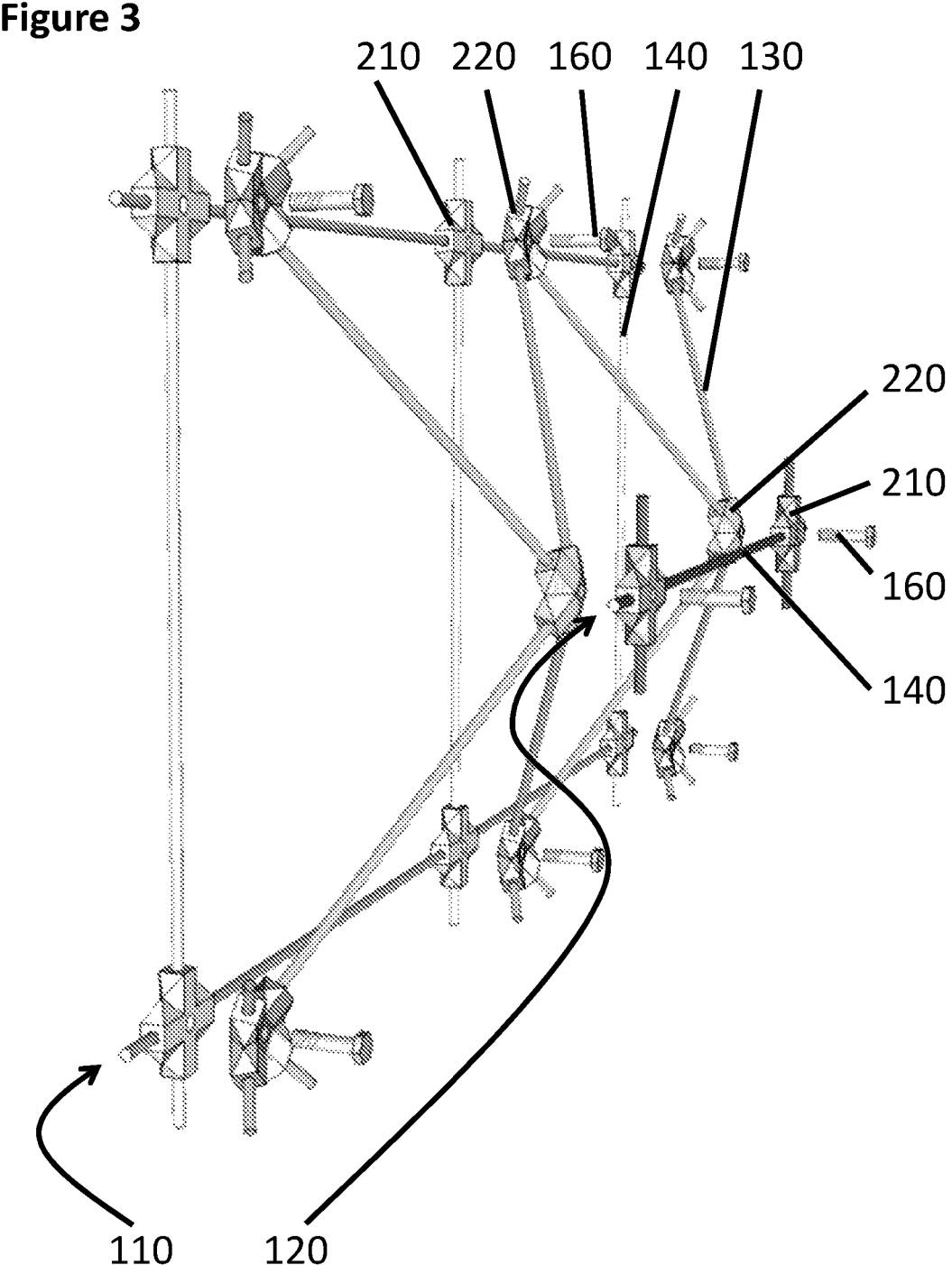
FIG. 3 shows an exploded schematic representation of an embodiment of a trellis according to the present invention.

FIG. 3 shows an exploded representation of a trellis 100 comprising a hub 200 according to the present invention, and clearly shows the two layers of hubs 110,120 interconnected by internal spars 130.

In certain embodiments of the present invention, the hubs 200 may be made of a plastic material, for example, but not limited to, a nylon. Spars 130,140 may, in certain embodiments of the invention, be made of glass-fibre-reinforced resin. These materials are referred to only in terms of being non-limiting examples. It is envisaged that other embodiments of the invention could employ hub members and spars made of, independently, metals; other types of plastic materials, such as UV-stable plastics and environmentally stable plastics; or even biodegradable materials, depending on the application for the structure to be made. For example, a reusable structure would ideally be made from a corrosion-resistant material, whereas a structure that might be used as the basis for a coral reef might be made of a biodegradable material since it would be not required once the reef had formed. Corrosion-resistant materials may also be suitable for use in adverse environments, such as coastal areas or underwater.

The hubs and spars of the present invention represent building blocks from which many different structures and scaffolds may be made. They are modular and readily packable for transport prior to assembly into a required structure. In certain embodiments of the present invention, the hubs and spars may be light weight. Such embodiments may be cost-effective in terms of transport, allow fast and simple construction of a variety of structures, and they may provide inherently strong but light structures due to their lattice-like arrangement in three-dimensions. Accordingly, the hubs of the present invention are adapted for use whereby spars link adjacent hubs in a three-dimensional structure.

In the illustrated embodiments, the first layer 110 of hubs 200 comprises hubs 200 positioned on or in close proximity to a vertical surface, such as a wall, wherein the first hub members 210 are located adjacent the vertical surface and the second hub members 220 are directed away from the vertical surface. The first layer 110 of hubs 200 are preferably linked and connected to each other to form a substantially planar array, by external spars 140 linking adjacent hubs 200 through their first hubs members 210. Accordingly, in embodiments of the invention having first hub members 210 comprising four spar receiving zones 215, the hubs 200 will form the corners of quadrilaterals, wherein the external spars 140 define the sides of those quadrilaterals.

The positioning of the first layer 110 of hubs 200 on or in close proximity to a vertical surface, may be carried out, in some embodiments, by fastening each hub 200 to the vertical surface. The fastening may be the use of a fastener such as a screw, bolt, or other similar fastener suitable for use with the vertical surface, passing through the hub 200 as a connector 160. As referred to above, the connector 160 defines a common, substantially central axis about which the first and second hub members 210,220 are joined. In yet further embodiments, an adhesive, such as a glue, may be employed to fasten the hubs to eth vertical surface.

The second layer 120 of hubs 200 comprises hubs 200 positioned distal from the vertical surface, wherein the first hub members 210 are located distal from the vertical surface and the second hub members 220 are directed towards the vertical surface. As with the first layer 110, the hubs 200 are preferably connected by external spars 140 linking adjacent hubs 200 through their first hub members 210, whereby a second substantially planar array is prepared. Accordingly, in embodiments of the invention having first hub members 210 comprising four spar receiving zones 215, the hubs 200 will form the corners of quadrilaterals, wherein the external spars 140 define the sides of those quadrilaterals.

Accordingly, the trellis 100 of the present invention comprises two layers 110,120 of hubs 200, wherein the outside of each layer comprises the first hub members 210, which, together with their interconnected external spars 140, define the first and second planes, which planes are substantially parallel.

In the illustrated embodiment, the first and second layers 110,120 are connected to form a trellis 100. The second hub members 220 of the first layer 110 are connected to the second hub members 220 of the second layer 120 via internal spars 130, thereby forming a three-dimensional array.

It will be apparent to the skilled person that, in order to generate a three-dimensional array in accordance with certain embodiments of the present invention, the first and second hub members 210,220 cannot be identical, as the two substantially parallel planes are generated by the substantially flat (first) hub members 210 and the interconnecting, internal spars 130 must meet the second hub members 220 at an angle of less than 90° to the connector 160.

As noted above, the hubs of the present invention are adapted for use whereby spars link adjacent hubs in a three-dimensional structure. Accordingly, in regular, ordered three-dimensional structures, first hub members are connected to first hub members in adjacent hubs through external spars. Similarly, second hub members are connected to second hub members in adjacent hubs through internal spars.

It will also be apparent to the skilled person that the connector 160 for the second layer 120 is required only to join the first and second hub members 210,220. In contrast, in the illustrated embodiment, the connector 160 for the first layer 110 may be also used to attach the first layer 120 of hubs 200 to the surface, whereby the trellis is attached to the surface. Accordingly, the connectors 160 for use with the first layer 110 may be longer than those for use with the second layer 120.

It will also be apparent to the skilled person that in a trellis of the present invention, one layer of hubs does not require to be fixed to a surface, shown in the illustrations as the second layer 120. Accordingly, as noted above, the connector 160 for the hubs 200 of the second layer 120 need only join the first and second hub members 210,220. In contrast, at least a proportion of the hubs 200 of the first layer 110 must be capable of being attached to a surface. Accordingly, in certain, non-illustrated embodiments of the present invention, the first and second hub members 210,220 may be joined using co-acting members that are co-formed with the hub members. Without intending to limit the scope of the present invention, the co-acting members may be in the form of male and female components that are adapted to substantially join the two hub members. For example, the first hub member may have a raised portion and the second member may have a correspondingly sized and positioned opening adapted to receive and retain the raised portion, whereby the first and second hub members are joined. The hubs members may further include a substantially centrally located opening, through which a fastener may be passed in order to fix the hub to a surface.

The skilled person will recognise that the angle of the second plurality of internal spar receiving zones 225, together with the length of the internal spars 130 will determine the distance between the first and second layers 110, 120, and thereby, the depth of the trellis.

In certain embodiments of the present invention, the external spars 140 are of a single length, whereby the hubs 200 in each layer form an array of regular shapes. For example, in embodiments of the invention having first hub members 210 comprising four equally spaced external spar receiving zones 215, the hubs 200 will form the corners of squares, wherein the external spars 140 define the sides of those squares. The present invention also encompasses different arrangements of the external spar receiving zones 215, whereby different shapes will be defined by the connection of adjacent hubs 200.

Figure 4:
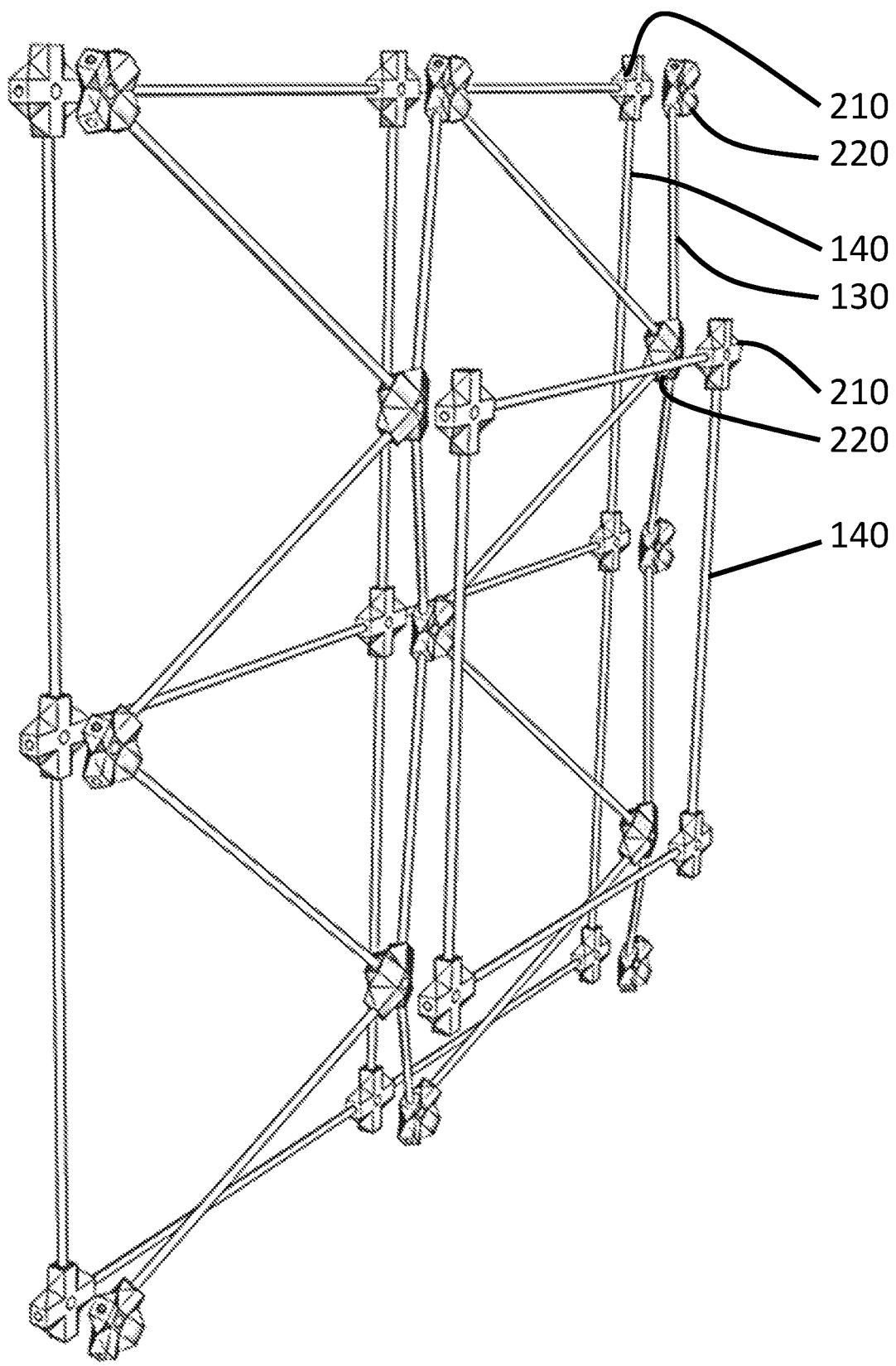
FIG. 4 shows an exploded schematic representation of an embodiment of a trellis according to the present invention, illustrating the layers used during assembly.

FIG. 4 shows an enlarged view of an exploded diagrammatic representation of the trellis illustrated in FIG. 3. In FIG. 4 it can be seen that the method of construction of a trellis using the hubs of the present invention comprises interconnecting first hub members and external spars; and second hub members and their interconnecting internal spars. The first hub members are then joined to their respective second hub members and attached to a substantially vertical surface. To complete the trellis, a second layer of first hub members and interconnecting external spars is then joined to the outer layer of second hub members.

The internal spars 130 may be a different length than that of the external spars 140. The length of the internal spars 130 will be determined by the desired distance between the first and second layers 110,120 and the desired angle between the internal spars 130 and the surface to which the trellis is mounted. In one, non-limiting example, the internal spars 130 may join second hub members 220 which are approximately 433 mm apart; and the external spars 140 may join adjacent first hub members 210 which are approximately 577 mm apart. In this particular embodiment the angle formed by the internal spars with the plane of each layer of hubs is approximately 20° and the second layer 120 is approximately 154 mm from the surface to which the trellis is mounted. In other, non-illustrated embodiments, the angle may be between approximately 10° and 60° and the lengths of the spars 130,140 may be adjusted to take into account the different angles and to adjust the distance of the second layer 120 from the surface. In certain embodiments: the spars may be at least 200 mm long and preferably less than 1000 mm long, or any length therebetween; the diameter of the spars 130, 140 is approximately 3 to 10 mm, preferably 5 min; and the hubs may be approximately 20 mm to 80 mm in diameter, most preferably approximately 40 mm in diameter.

Figure 5:
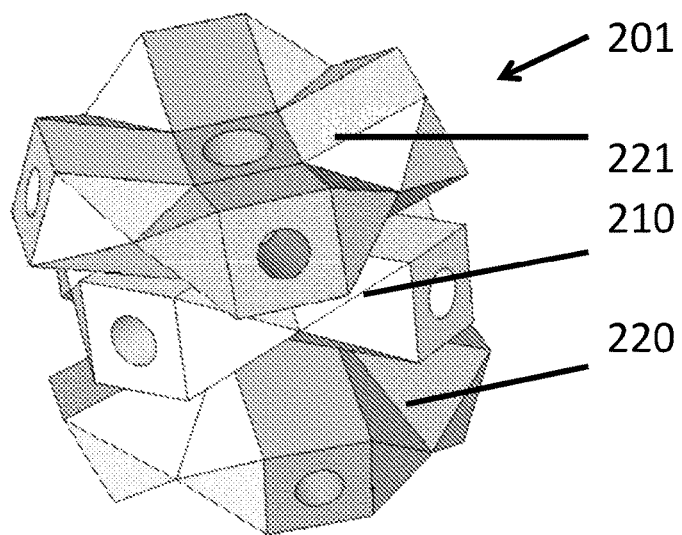
FIG. 5 shows a schematic diagram of an embodiment of a three-layered hub according to the present invention.
Figure 6:
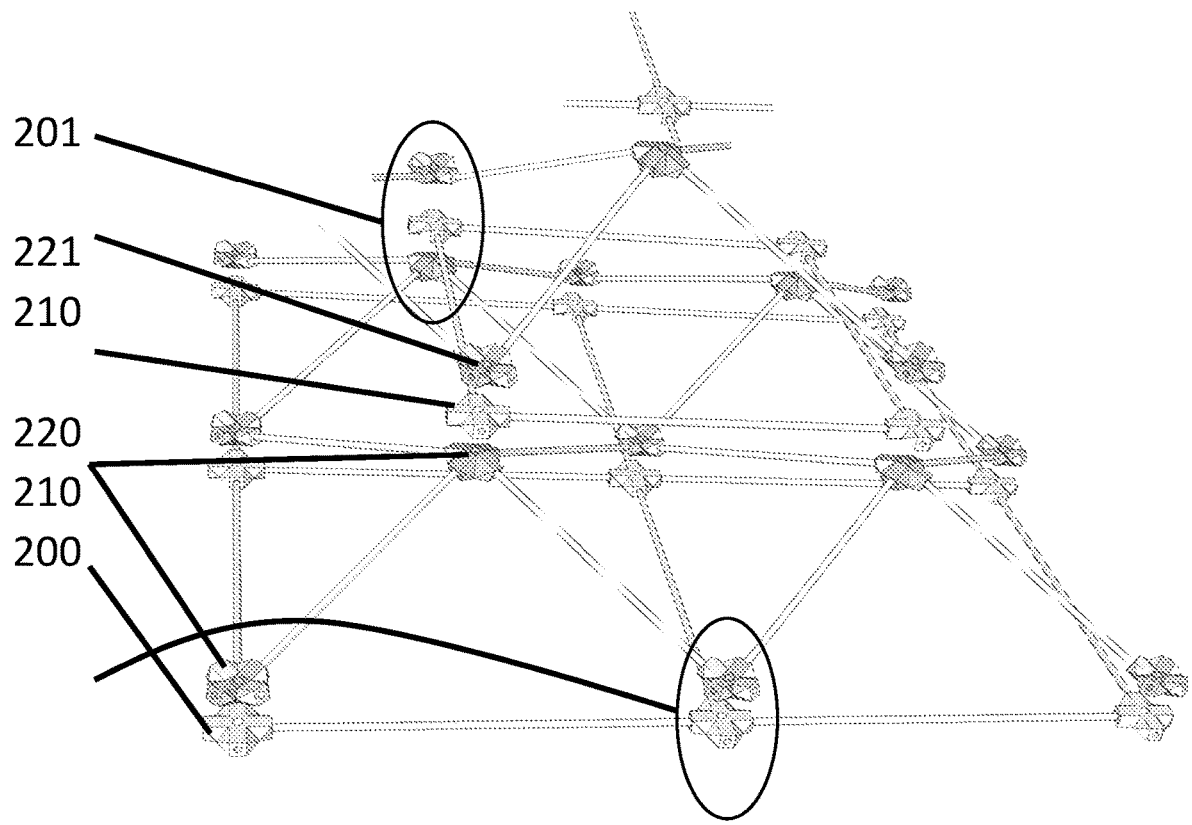
FIG. 6 shows a schematic representation of an embodiment of a multiply-layered structure according to the present invention, which may be prepared using the embodiment of the hub shown in FIG. 5.

While the above description relates to a two-layered arrangement, a simple modification would allow the construction of multiply-layered arrangements. Specifically, adding an additional second hub member 221 to the outside of the hub would allow the construction of such an arrangement by following the directions provided herein. An example of such a three-layered hub 201 is shown in FIG. 5. FIG. 6 shows an exploded view of a multiply-layered arrangement wherein: (i) three-membered hubs 201 are positioned in the inner layer of hubs and spars; (ii) the second hub members 220/221 are connected by internal spars; and (iii) the first hub members 210 are connected to other first hub members 210 within the same layer of hubs. The three-layered hub 201 may be used to construct a structure having many layers of hubs, not simply the three layers shown in FIG. 6. In preferred embodiments of such multiply-layered structures, there are at least two types of hub: the outer layers comprise hubs with a first and a second hub member; the inner layers have at least two second hub members, and optionally a first hub member located between the two second hub members.

In yet further embodiments of the present invention, a hub may be constructed using two second hub members (not illustrated). Such a hub is potentially useful as a replacement for the three-layered hub 201 shown in the structure of FIG. 6. The lack of a first hub member in such a hub would result in a lighter structure due to the absence of an internal layer of spars interconnecting the inner layer of hubs.

The use of the hubs of the present invention is not limited to light-weight structures such as trellis, as described herein. The structures may be constructed on any size scale depending on the desired use of the structure. Heavy duty versions of the hubs and spars could find application in many additional situations, including architectural and industrial application such as, but not limited to, scaffolding.

All the embodiments illustrated herein comprise a single length for the external spars and a single length for the internal spars. Such a situation will produce a regular, "lattice"-like arrangement. It is also envisaged that a variety of lengths of each spar type may be employed in different embodiments of the present invention. These different lengths may allow the production of a variety of three-dimensional structures, to suit a variety of specific applications. For example, it is possible to form many different structures, such as, but not limited to, cubes, rectangular prisms, pyramids, spheres, domes, spheroids etc., as well as non-regular, three-dimensional structures.

It is envisaged that a trellis according to the present invention may be used in many different applications. While the trellis is illustrated in the Figures and discussed above as being attached to a substantially vertical surface, it is equally possible to mount the trellis on a non-vertical surface. Such a trellis may be used for supporting the growth of plants in a substantially horizontal orientation. One, non-limiting application of a horizontally arranged trellis is to support the growth of aquatic plants, such as seaweeds, or aquatic animals, such as corals or oysters. In further aquatic applications, the trellis may be freestanding in water in a substantially vertical orientation to allow support for suitable species of aquatic plants or animals.

The use of a trellis according to the present invention in gardening and agricultural applications should not be viewed as limiting the scope of the present invention. A trellis made according to the present invention may find many and varied additional and alternative uses, such as, but not limited to, an architectural feature on a building; a structure over which a shade material may be positioned; a platform upon which a floor may be provided. Such alternative uses may require the various components to be made of stronger materials than described above. The skilled person would readily understand the specific requirements for these stronger materials and could adapt the disclosure of the present invention accordingly, and without the need for inventive input.

Where the terms "comprise", "comprises", "comprised" or "comprising" are used in this specification, they are to be interpreted as specifying the presence of the stated features, integers, steps or components referred to, but not to preclude the presence or addition of one or more other feature, integer, step, component or group thereof.

Further, any prior art reference or statement provided in the specification is not to be taken as an admission that such art constitutes, or is to be understood as constituting, part of the common general knowledge.

The invention claimed is:

1. A trellis hub, comprising:
   i) a first unitary hub member having a closed three-dimensional shape comprising multiple flat polygonal faces meeting at straight edges and vertices and comprising a first plurality of integral trellis spar receiving zones, each spar receiving zone being an enclosed aperture of closed shape;
   ii) a second unitary hub member having a closed three-dimensional shape comprising multiple flat polygonal faces meeting at straight edges and vertices and comprising a second plurality of integral trellis spar receiving zones, each spar receiving zone being an enclosed aperture of closed shape; and
   iii) a connector
   wherein:
   a) the first and second hub members are rotatable relative to each other about a common, substantially central axis;
   b) the first hub member is not identical to the second hub member;
   c) the connector passes through the first hub member and the second hub member; and
   d) each integral trellis spar receiving zone is adapted to receive an end of a trellis spar independently of the other hub member such that the end of the trellis spar terminates in only a single hub member.

2. The trellis hub of claim 1, wherein the first and second plurality of trellis spar receiving zones are apertures being substantially circular.

3. The trellis hub of claim 1, wherein the connector defines the common, substantially central axis.

4. The trellis hub of claim 1, wherein the connector comprises complementarily shaped interacting members which are co-formed with respective hub members.

5. The trellis hub of claim 1, wherein the first plurality of trellis spar receiving zones are arranged radially around the first hub member in a plane that is perpendicular to the central axis.

6. The trellis hub of claim 1, wherein the second plurality of trellis spar receiving zones are arranged radially around the second hub member and directed at an angle of less than 90° relative to the central axis.

7. The trellis hub of claim 1, wherein at least one of the first or second hub members comprises four trellis spar receiving zones.

8. A trellis preparation kit comprising the trellis hub defined in claim 1, and a plurality of trellis spars.

9. A trellis comprising a plurality of trellis hubs according to claim 1, and a plurality of trellis spars connected thereto via the trellis spar receiving zones.

* * * * *